United States Patent
Allen

(10) Patent No.: US 9,491,188 B1
(45) Date of Patent: *Nov. 8, 2016

(54) LATENCY-BASED DETECTION OF COVERT ROUTING

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 110 days.

This patent is subject to a terminal disclaimer.

(21) Appl. No.: 14/164,022

(22) Filed: Jan. 24, 2014

(51) Int. Cl.
*G06F 21/55* (2013.01)
*H04L 29/06* (2006.01)

(52) U.S. Cl.
CPC ................... *H04L 63/1408* (2013.01)

(58) Field of Classification Search
CPC ..................................... G06F 21/556
See application file for complete search history.

(56) References Cited

U.S. PATENT DOCUMENTS

| | | | |
|---|---|---|---|
| 7,885,188 B2 | 2/2011 | Joshi | |
| 8,151,348 B1 * | 4/2012 | Day | 726/22 |
| 8,204,982 B2 | 6/2012 | Casado et al. | |
| 8,392,609 B2 | 3/2013 | Sen et al. | |
| 8,463,904 B2 | 6/2013 | Casado et al. | |
| 8,694,676 B2 | 4/2014 | Sen et al. | |
| 2002/0002681 A1 | 1/2002 | Kawano et al. | |
| 2002/0188864 A1 * | 12/2002 | Jackson | 713/201 |
| 2012/0144187 A1 | 6/2012 | Wei et al. | |
| 2013/0055320 A1 * | 2/2013 | Mitchell | 725/76 |
| 2013/0185802 A1 * | 7/2013 | Tibeica et al. | 726/26 |
| 2014/0156868 A1 | 6/2014 | Sen et al. | |

FOREIGN PATENT DOCUMENTS

| | | |
|---|---|---|
| EP | 1543668 | 9/2003 |
| EP | 2461538 | 6/2012 |
| WO | 2004028110 | 4/2004 |

OTHER PUBLICATIONS

Martin Casado, et al., Peering Through the Shroud: The Effect of Edge Opacity on IP-Based Client Identification, Stanford University, https://www.usenix.org/legacy/event/nsdi07/tech/full_papers/casado/casado_html/illum-nsdi07.html, accessed Jul. 10, 2014.

* cited by examiner

*Primary Examiner* — Josnel Jeudy
(74) *Attorney, Agent, or Firm* — Davis Wright Tremaine LLP

(57) ABSTRACT

A method and apparatus for detecting covert routing is disclosed. In the method and apparatus, a plurality of first data portions addressed to a remote computer system are forwarded over a first network path, whereby each first data portion of the plurality of first data portions is associated with a computer system of a plurality of computer systems. Further, a plurality of first network performance metrics are obtained, whereby each first network performance metric of the plurality of first network performance metrics is associated with a routing of a first data portion of the plurality of first data portions over the first network path. A likelihood of covert routing is determined based at least in part on the plurality of first network performance metrics.

20 Claims, 9 Drawing Sheets

LATENCY-BASED DETECTION OF COVERT ROUTING

CROSS REFERENCE TO RELATED APPLICATIONS

This application incorporates by reference for all purposes the full disclosure of co-pending U.S. patent application Ser. No. 14/163,997, filed Jan. 24, 2014, entitled "DETECTING COVERT ROUTING".

BACKGROUND

Covert routing may be used in attempts to infiltrate network computer systems and circumvent access control policies. Further, through covert routing users, or devices may gain access to restricted computer systems. Covert routing may be facilitated by secret cooperation between the users or the devices and a covert router. The covert router may receive packet data transmissions that are addressed to an unrestricted computer system and may redirect the packet data transmissions of the infiltrating users or devices to restricted computer systems. In certain circumstances, it may be difficult to detect the occurrence of covert routing or prevent the covert routing. Further, it may be difficult to identify network routers or users that participate in malicious activity. For example, packet data transmissions in a network may be inaccessible for monitoring due at least in part to legal or contractual requirements or because the packet data transmissions may be encrypted.

Accordingly, it may be challenging to detect the occurrence of covert routing activity or parties that participate in covert routing. Further, it may also be challenging to distinguish covert routing activity from non-malicious activity.

BRIEF DESCRIPTION OF THE DRAWINGS

Various embodiments in accordance with the present disclosure will be described with reference to the drawings, in which.

DETAILED DESCRIPTION

Figure 1:
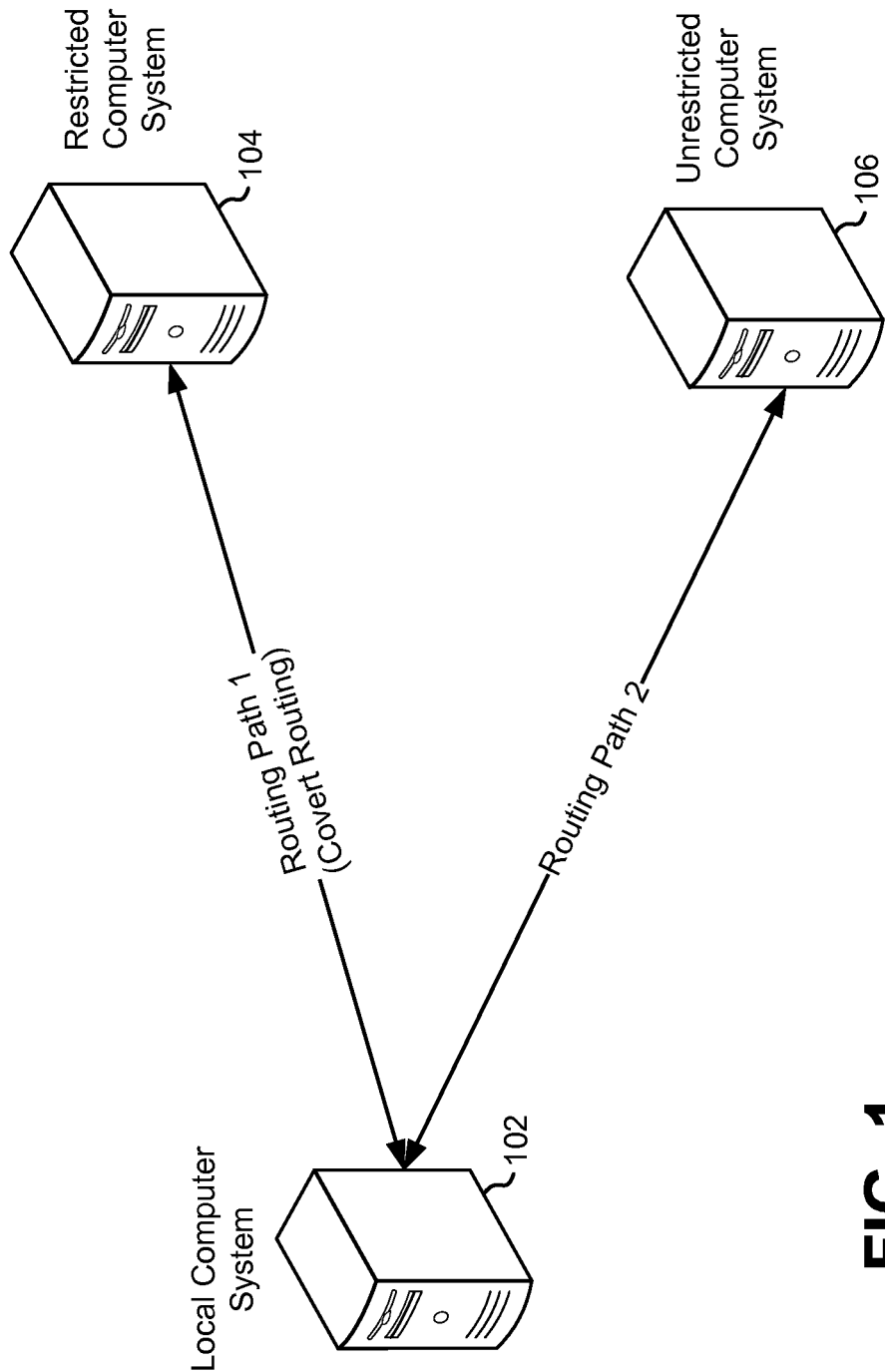
FIG. 1 shows an example of detecting covert routing in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the detection of covert routing of data in a network based at least in part on responses to the data, which may be in accordance with a connection-oriented protocol. A local computer system may communicate with a remote computer system over a network, such as the Internet, using a connection-oriented protocol. Operating in accordance with the connection-oriented protocol may require the local computer system and the remote computer system to exchange response messages as a result or receipt of data. A response message may offer information indicative of the state of the connection between the two systems. For example, in the Transmission Control Protocol and the Internet Protocol (TCP/IP), a response message may indicate that the remote computer system does not recognize the local computer system as a party to a connection or may request that the connection be reset if the remote computer system does not have a frame of reference for the received data or does not retain a state associated with the received data. The responses exchanged by the two computer systems may be used to identify the potential of an occurrence of covert activity along a routing path in a network. The covert activity may be a result of a covert router secretly directing traffic away from a purported destination computer system and towards another computer system, whereby access to the other computer system may be restricted. If the routing path between two computer systems is perturbed to avoid a covert router, connection-oriented protocol response messages may be used to reveal that covert routing took place prior to perturbing the routing path. A computer system or a router that is identified as participating in covert routing may be restricted.

A filtering device may perturb at least a portion of a routing path between a local computer system and a remote computer system. The filtering device may be any type of router that is used to receive traffic, examine the traffic by, for example, inspecting addressing information of the traffic and relay the traffic to another device. Examples of the filtering device include any type of router, such as an edge router of a network. Further, the filtering device may be part of a firewall and may be used to secure a network trust zone by preventing unauthorized data from being routed to the trust zone. The filtering device may operate in accordance with a border gateway protocol (BGP) and may be connected to a plurality of routers. The filtering device may receive traffic from a local device and forward the received traffic to one or more of the plurality of routers. In accordance with the BGP protocol, the filtering device may associate a weight with each of the plurality of routers, whereby the weight may influence the likelihood of sending the data to the router. In other words, the weight assigned to a router may correlate to the probability of that router being selected.

A routing path may comprise one or more routers that are connected to one another (for example, serially). Data may traverse the routing path from one end to another end, whereby each router of the plurality of routers may relay the data further along the routing path to a destination, such as a remote computer system. If a covert router is present in the routing path, the covert router may redirect the data to a restricted computer system. The covert router may identify the data to be rerouted based at least in part on a type of the data or a pattern associated with the data. For example, the covert router may identify the data based at least in part on a frequency of receipt of packets of the data (also known as a knock pattern). Accordingly, the covert router may cooperate with a local computer system to circumvent an access restriction of a remote computer system. At the same time, the covert operation may be unknown to the filtering device or other routers in the network. For example, the data may have been permitted entry into the network by the filtering device based at least in part on being addressed to an unrestricted computer system.

When the filtering device receives a first data portion from a local computer system that is addressed to an unrestricted remote computer, the filtering device may forward the first data portion on a first routing path. The first routing path may include a covert router that redirects the data to a restricted computer system. Accordingly, the unrestricted remote computer system may not recognize the local computer system as a party to communication and may have a state associated with the first data portion or the local computer system. The filtering device may forward a second data portion on a second routing path. The second data portion may be a duplicate of the first data portion or other data received from local computer system. The second routing path may not include a covert router and, accordingly, the second data portion may be received by the unrestricted computer system. The unrestricted computer system may send a response message to the local computer system whereby the response message may indicate that the unrestricted computer system does not recognize the local computer system as a party to a communication, among others. The filtering device may utilize the response to detect the presence of potential covert activity. Further, the filtering device may update a fraud metric associated with the local computer system based at least in part on the detected potential for covert activity. The fraud metric may be associated with a time decay that allocates more weight to newer fraud metric updates than older updates.

As described herein, the filtering device may also determine a network performance metric (for example, a latency measurement) associated with the first routing path and a network performance metric associated with the second routing path. The latency measurement may measure the amount of time that lapses between sending a data portion by the filtering device (for example, to a first router on a routing path) and receiving a response message associated with the data portion. The difference between the latency measurements of a local computer system across the two routing paths may be evaluated and compared to differences of latency measurements of other local computer systems. Based at least in part on the comparison, indications of potential malicious activity may be detected. For example, if the difference between the latency measurements that is calculated for the local computer system is more than a threshold above or below the difference between the latency measurements that is calculated for a plurality of local computer systems, potential malicious activity by the local computer system may be deemed to be identified. The fraud metric associated with the local computer system may be updated to reflect the detected potential malicious activity. A fraud metric that exceeds a specified limit may indicate that a local computer system participates in covert routing or secretly cooperates with a router to circumvent access policies.

FIG. 1 shows an example of detecting covert routing in accordance with at least one embodiment. A local computer system 102, which may be any type of device capable of communicating with a remote computer system, may access a restricted computer system 104 using a first routing path (denoted as routing path 1 in FIG. 1). The restricted computer system may have access control policies that limit the access by the local computer system 102. The local computer system 102 may gain access to the restricted computer system 104 by secretly cooperating with a covert router that is part of the first routing path, whereby the covert router may redirect traffic associated with the local computer system 102 to or from the restricted computer system 104. The routing may be switched to a second routing path (denoted as routing path 2 in FIG. 2) that does not include the covert router and, accordingly, the local computer system may only access an unrestricted computer system 106. As described herein, responses received from the unrestricted computer system 106 may be used to reveal that covert routing occurs on the first routing path.

Figure 2:
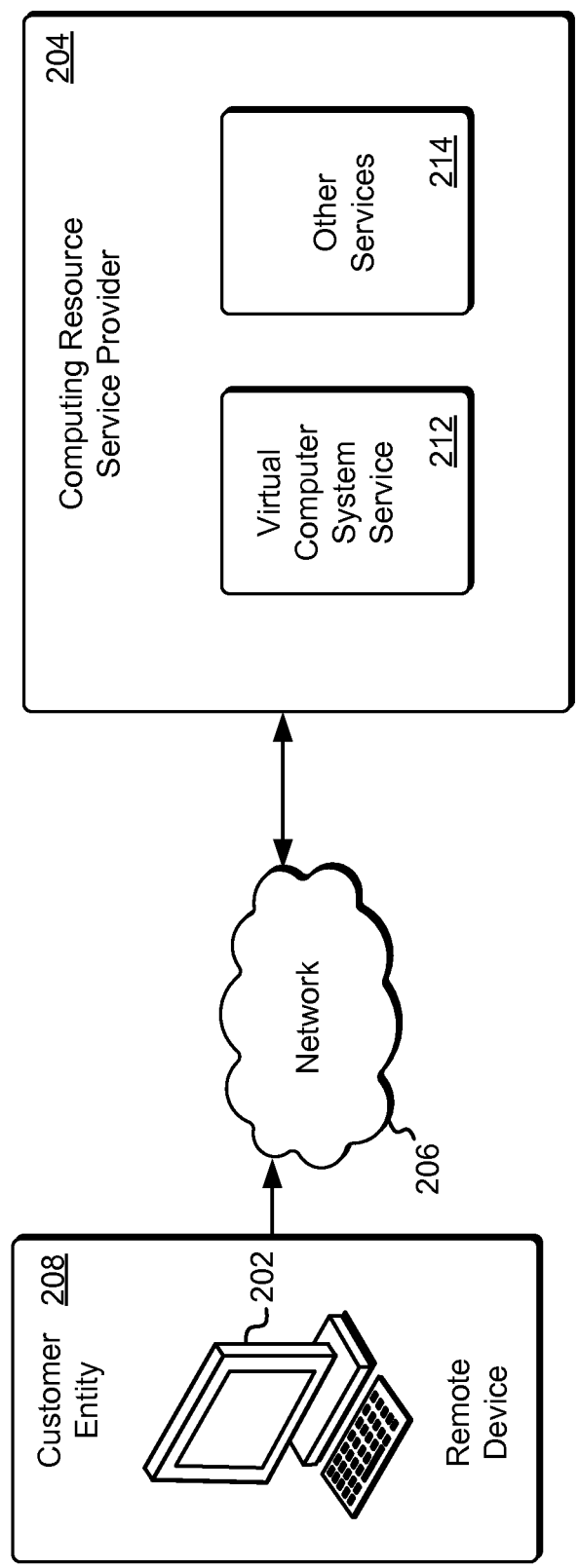
FIG. 2 shows an example of a user device in communication with a computing resource service provider in accordance with at least one embodiment.

FIG. 2 shows an example of a remote device in communication with a computing resource service provider in accordance with at least one embodiment. The remote device 202 is associated with a customer entity 208 and communicates with the computing resource service provider 204 over a network 206. The customer entity 208 may be an organization or group, whereby the organization or group may utilize the services of the computing resource service provider 204 for a variety of purposes, such as running web or email servers, operate business applications or, generally, providing computing power for customer servers. Although one remote device 202 is shown as belonging to the customer entity 208, it is noted that a plurality of devices may be associated with the customer entity 208. In addition, one or more of the devices may belong to an administrator that is responsible for assigning privileges and permissions to the users associated with the customer entity 208.

The remote device 202 may be any device that is configured to communicate with the computing resource service provider 204 or its associated entities. The remote device 202 may also be equipped with local or remote (for example, network-based) computational and storage capabilities. The remote device 202 may also be equipped with communications and networking hardware and may be configured to communicate using any communications protocol. The remote device 202 may be associated with a customer, which may be an organization that may utilize one or more of the services provided by the computing resource service provider 204, for example, to maintain and deliver information to its employees, which may be located in various geographical locations. Additionally, the customer may be an individual that utilizes the services of the computing resource service provider 204 to deliver content to a working group located remotely.

The network 206 may be a collection of routers, switches or various other types of devices that enable data (for example, protocol-compliant packets) to be exchanged between the remote device 202 and the computing resource service provider 204. The network 206 may be public or private, whereby examples of the network 206 include the Internet, an intranet or an Internet service provider (ISP) network.

The computing resource service provider 204 may provide various computing resource services to its customers. The services provided by the computing resource service provider 204 in this example, include a virtual computer system service 212 and one or more other services 214. As described herein, each of the services 212-214 may include one or more web service interfaces that enable the customer to submit appropriately configured application programming interface (API) calls to the various services through web service requests. In addition, each of the services 212-224 may include one or more service interfaces that enable the services to access each other. As described herein, the computing resource service provider 204 may be equipped with a filtering device, which may be an edge router. The filtering device may receive traffic from the network 206 that is addressed to the computing resource service provider 204 or its associated entities and may forward the traffic to one or more destination computer systems within the computing resource service provider 204.

The virtual computer system service 212 may be a collection of computing resources configured to instantiate virtual computer systems on behalf of a customer. The customer may interact with the virtual computer system service 212 (via appropriately configured and authenticated API calls) to provision and operate virtual computer systems that are instantiated on physical computing devices hosted and operated by the computing resource service provider 204. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 212 is shown in FIG. 2, any other computer system or computer system service may be utilized in the computing resource service provider 204, such as a computer system or computer system service that does not employ virtualization, instantiation or abstraction and instead provisions computing resources on dedicated or shared computers/servers and/or other physical devices.

The computing resource service provider 204 may maintain one or more other services 214 based at least in part on the needs of customers. For instance, the computing resource service provider 204 may maintain a database service. The database service may be a collection of computing resources that collectively operate to run one or more databases, and a customer may operate and manage a database from the database service by utilizing appropriately configured API calls. This, in turn, may allow for maintaining and potentially scaling the operations in the database. Other services include, but are not limited to, object-level archival data storage services, services that manage and/or monitor other services and/or other services.

Figure 3:
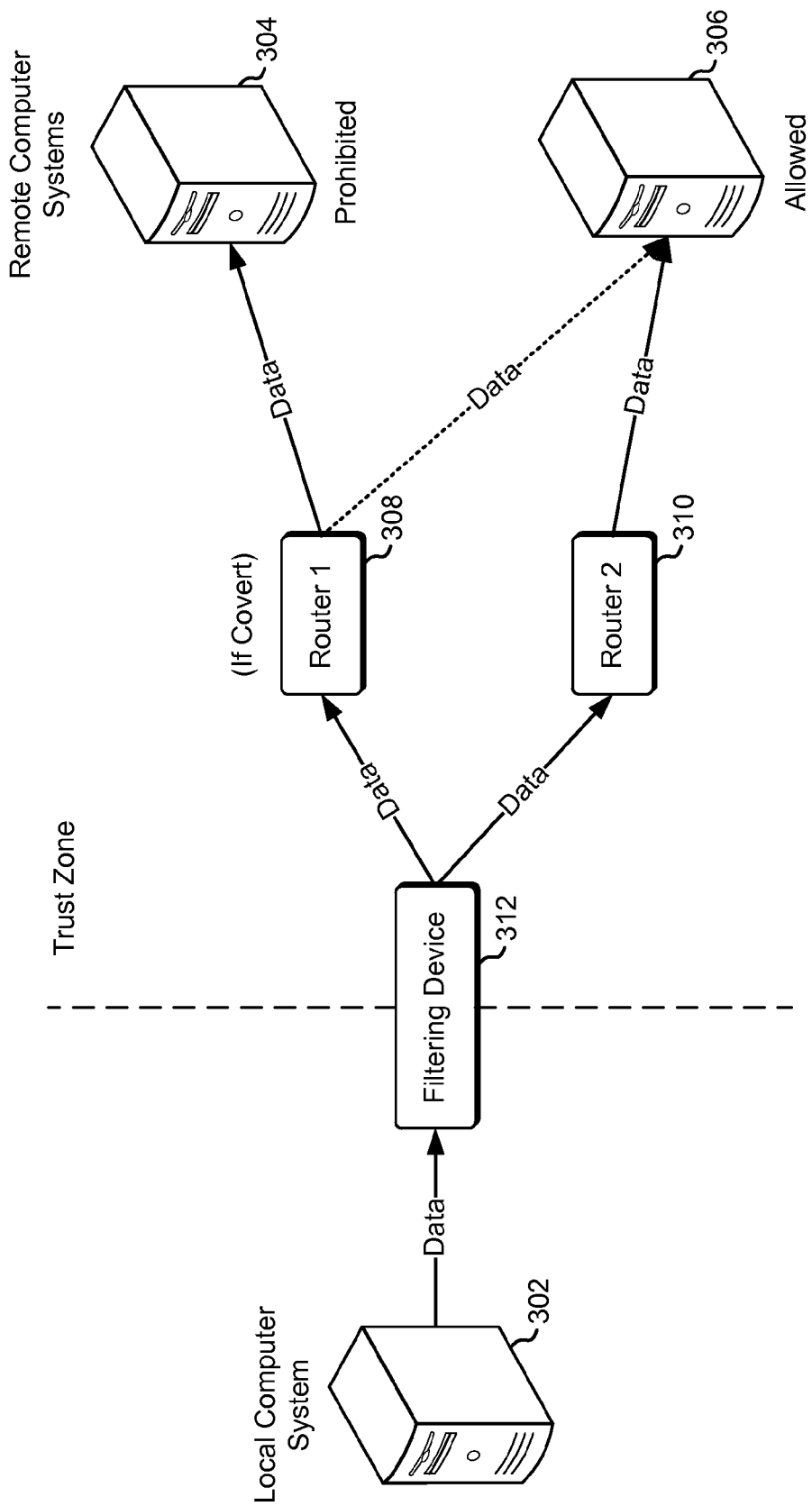
FIG. 3 shows an example of an environment in which a local computer system is connected to a remote computer system in accordance with at least one embodiment.

FIG. 3 shows an example of an environment in which a local computer system is connected to a remote computer system in accordance with at least one embodiment. The local computer system 302 may be any type of computing device that is capable of communicating with other computing devices, for example, utilizing any type of communication protocol. The local computer system 302 may be a personal computer (PC), a server or any other type of connected computing device, such as a tablet computer, a smartphone or a smart television, among others. Further, the local computer system 302 may be a virtual computing machine that is abstracted or instantiated utilizing underlying physical computing resources. The local computer system 302 may be equipped with I/O capability that enables the local computer system 302 to communicate with various parties, such as routers and remote computer systems. Further, the local computer system 302 may be equipped with local or remote (for example, network-based) computational and storage capabilities. The computational capabilities of the local computer system 302 may be provided at least in part by a processor, such as a central processing unit (CPU), graphics processing unit (GPU) and digital signal processor (DSP), among others. Examples of CPUs include CPUs that employ an x86 architecture or a reduced instruction set computing (RISC) architecture. Additionally, the local computer system 302 may include any type of memory, such as static or dynamic memory and a power source or a power adapter.

The local computer system 302 (also referred to herein as a compute node) may also be equipped with communications and networking hardware that facilitates communication using any communications protocol, such as Transmission Control Protocol and Internet Protocol (TCP/IP). Aside from its hardware capability, the local computer system 302 may be configured to run or execute an operating system and/or other programs, and the local computer system's 302 associated memory may store executable instructions that, when executed by one or more processor, cause one or more functions to be performed or cause the operating system and/or other programs to run. The local computer system 302 may be associated with a customer, which may be an organization that may utilize one or more of the services provided by a computing resource service provider, for example, to maintain and deliver information to its employees, which may be located in various geographical locations. Additionally, the customer may be an individual that utilizes the services of the computing resource service provider to deliver content to a working group located remotely.

The local computer system 302 may communicate with one or more remote computer systems by sending data to the one or more remote computer systems and receiving data from the one or more remote computer systems. The data may be any bit, Byte or packet of information, whereby the data may be in accordance with a communication protocol, such as Hypertext Transfer Protocol (HTTP). In some embodiments, the communication protocol may be a connection-oriented protocol, such as TCP/IP. Two remote computer systems 304, 306 are shown in FIG. 3 including a prohibited computer system 304 and an allowed computer system 306. The local computer system 302 may be restricted from accessing the prohibited computer system 304, whereby, for example, access restriction policies may be enforced that limit the capability of the local computer system to send data to or receive data from the prohibited computer system 304. Conversely, the local computer system 302 may be permitted to communicate with the allowed computer system 306, whereby few or no restrictions may be imposed on the ability of the local computer system 302 to send data to or receive data from the allowed computer system 306.

The local computer system 302 may send data addressed to the remote computer systems 304, 306 to a filtering device 312. The filtering device 312 may be any type of network device, such as an edge router. Further, the filtering device 312 may be part of a firewall that is configured to establish a trust zone, whereby the filtering device 312 may receive data and inspect the data to determine whether to forward the data to a network of connected routers and computer systems. The network of connected routers and computer systems may be part of the trust zone, and data traffic entering or leaving the network may be regulated by the filtering device 312. For example, the filtering device 312 may receive data that is addressed to a remote computer system and may determine whether to forward the received data to the remote computer system. For example, if the filtering device 312 receives data from the local computer system 302 that is addressed to the prohibited computer system 304, the filtering device 312 may not permit the data to be forwarded to the prohibited computer system 304. For example, the filtering device 312 may inspect metadata associated with a received data packet and may identify a destination address and an originating address of the data packet. The filtering device 312 may evaluate the addresses to determine whether the local computer system 302 from which the received data packet originates is allowed access to the remote computer system specified by the destination address. If the filtering device 312 determines that the local computer system 302 is allowed to access the remote computer system, the filtering device 312 may permit the received data packet to be forwarded to the allowed computer system 306, whereby the data remains addressed to the allowed computer system 306 upon entry in the network. Permitting the received data packet to be forwarded to the allowed computer system 306 may include dispatching the received data packet to the allowed computer system 306 along a first routing path. Conversely, if the filtering device 312 determines that the local computer system 302 is not permitted access, the filtering device 312 may deny forwarding the received data packet to the prohibited computer system 304.

The remote computer systems 304, 306 may both be located in a trust zone, whereby it may be presumed that the access control policies (for example, address-based access control policies) that specify the capability of the local computer system 302 to communicate with the remote computer systems 304, 306 are enforced. The access control policies may be enforced by the filtering device 312 or one or more routers that relay communications between the remote computer systems 304, 306 and the local computer system 302. A communication between the local computer system 302 and the remote computer system 304, 306 may traverse a path in a network. One or more routers may be relay points on the path and may forward data to each other, the local computer system 302 or the remote computer system 304, 306. For example, a communication between the local computer system 302 and the remote computer system 304, 306 may traverse a path having several routers, whereby each router may forward the communication further along the path.

A router that relays communication along a path may be assumed to enforce access policies associated with the local computer system 302, whereby the router may not forward a communication originating from the local computer system 302 to the prohibited computer system 304 or vice-versa. Instead the router may only relay a communication to its destination address (for example, the allowed computer system 306). However, in some embodiments, the local computer system 302 and a router may cooperate to circumvent access control policies and may cause a communication originating from the local computer system 302 to be sent to the prohibited computer system and vice-versa. A router that is utilized to circumvent access control policies or to enable communication with a prohibited computer system 304 is referred to herein as a covert router. The covert router may secretly cooperate with the local computer system 302 to redirect a communication originating from the local computer system 302 to the prohibited computer system 304 instead of the allowed computer system 306. Accordingly, the covert router may enable circumventing access control policies and granting the local computer system 302 access to a restricted remote computer system. In some embodiments, if the covert router is not cooperating with certain local computer systems, the covert router may route data pertaining to these computer systems to the allowed computer system 306.

The one or more routers are shown in FIG. 3 to include a first router 308 and a second router 310, whereby the first router 308 is a covert router and the second router 310 is not a covert router. The first router 308 and the second router 310 may each receive data that is addressed to the allowed computer system 306. Although FIG. 3 shows the data to be received from a filter 310, the data may be received from one or more other routers in a network (not shown). Further, if a plurality of routers are used as relay points, the first router 308 and the second router 310 may send the data to one or more other routers (now shown), which may in turn cause the data to be sent to a remote computer system.

As described herein, the second router 310 may cause received data that is addressed to the allowed computer system 306 to be forwarded there. Further, the second router 306 may not forward the data to the prohibited computer system 304 due to the fact that the local computer system 302 is restricted from accessing the prohibited computer system 304. Conversely, the first router 308 (as a covert router) may cause data that is addressed to the allowed computer system 306 to be forwarded to the prohibited computer system 304. Accordingly, unbeknownst to a network, data that is addressed to the allowed computer system 306 may be caused to be transmitted to the prohibited computer system 304 by the first router 308. If the first router 308 is directly connected to the prohibited computer system 304, the direct connection permits sending the data by the first router 308 to the prohibited computer system 304 without further relay by another router.

If the first router 308 is not directly connected to the prohibited computer system 304, the first router 308 may cause the data to be relayed to the prohibited computer system 304 by other routers in a network. For example, the first router 308 may change the destination address of packets of data addressed to the allowed computer system 306 to become addressed to the prohibited computer system 304. Accordingly, the presence of the first router 308 in a connection path of the local computer system 302 may enable circumventing any established address-based access restriction and may cause data addressed to the allowed computer system 306 to be redirected to the prohibited computer system 304. Conversely, the second router 310 may observe address-based access restriction and may not cause data that is addressed to the allowed computer system 306 to be sent to the prohibited computer system 304.

To ensure the enforcement of access restriction policies and prevent a computer system, such as local computer system 302, from gaining access to a prohibited computer system, such as prohibited computer system 304, the filtering device 312 or another network entity may attempt to detect the presence of a covert operation and identify one or more fraudulent parties. The fraudulent party may be a router in a network, such as covert router 308, a local computer system or a user of a local computer system. The user of the local computer system may, for example, be identified based at least in part on an account that is associated with the user and utilized to access the remote computer system.

Figure 4:
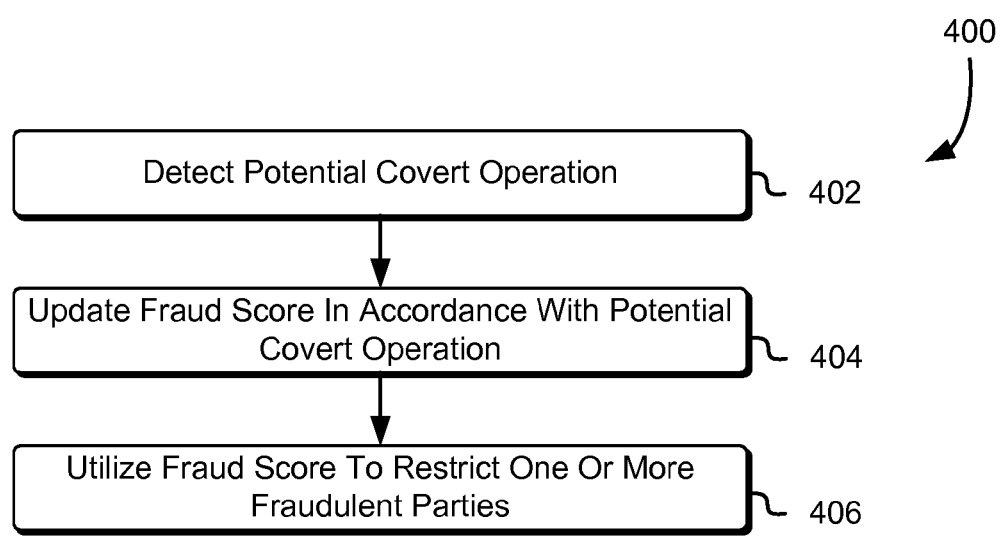
FIG. 4 shows an example of a method for identifying one or more fraudulent parties in accordance with at least one embodiment.

FIG. 4 shows an example of a method for identifying one or more fraudulent parties in accordance with at least one embodiment. In the process 400, a filtering device detects 402 a potential covert operation. As described herein, the covert operation may be detected by at least taking advantage of packet exchanges between two parties to a connection that are inherent in certain connection-oriented protocols, such as a TCP/IP protocol. The filtering device then updates 404 a fraud score in accordance with the potential covert operation. The fraud score may be updated over time as covert operations are detected and may be associated with a decay factor that reduces the influence of older detected operations and gives greater influence to a newly detected covert operation.

The filtering device utilizes 406 the fraud score to restrict one or more fraudulent parties. For example, if the filtering device determines that a local computer system and a network router cooperate to grant the local computer system access to a prohibited computer system, the filtering device may deny the local computer system access to the network. The filtering device may also route incoming data away from the network router or cause a notification to be sent to a system administrator indicating that the network router is a fraudulent party.

Figure 5:
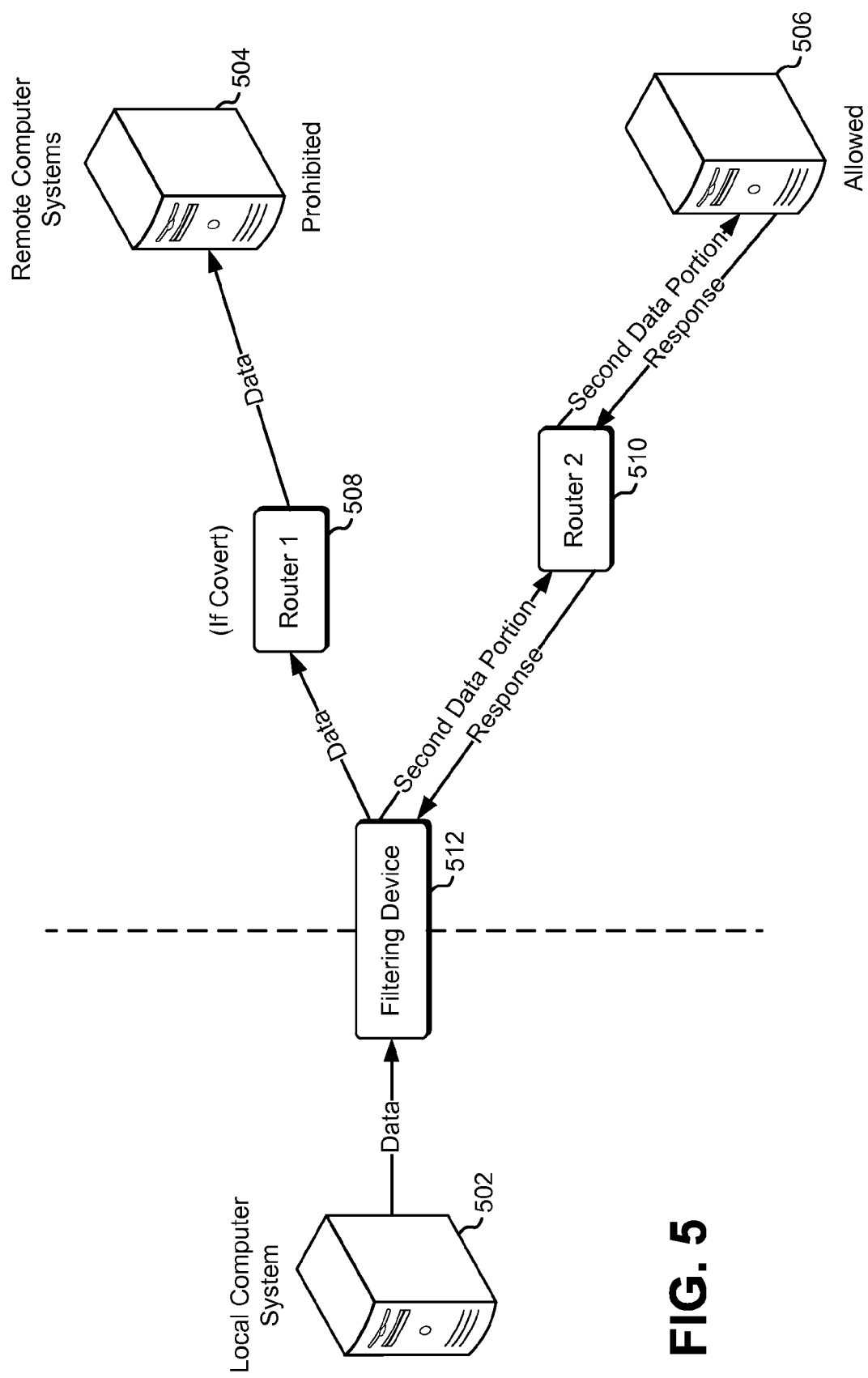
FIG. 5 shows an example of an environment for detecting circumvention of access restriction in accordance with at least one embodiment.

FIG. 5 shows an example of an environment for detecting circumvention of access restriction in accordance with at least one embodiment. A local computer system 502 is permitted access to an allowed computer system 506 and precluded from accessing a prohibited computer system 504. A filtering device 512, which may, for example, be an edge router for a network receives data from the local computer system 502 and evaluates the data to determine whether the data is addressed to a computer system for which the local computer system 502 is permitted access (for example, the allowed computer system 506) or to a computer system for which the local computer system 502 is not permitted access (for example, the prohibited computer 504). If the filtering device 512 determines that the data is addressed to a computer system for which the local computer system 502 is permitted access, the filtering device 512 forwards the data to a network router traversing a first routing path. As shown in FIG. 5, the filtering device 512 forwards the data to router 1 (which is referred herein as a first router and referenced by the numeral 508). The first router 508 may be a covert router residing on the first routing path and may cause the data to be sent to the prohibited computer system 504 instead of the allowed computer system 506.

If the first router 508 has a direct connection to the prohibited computer system 504, the first router 508 may send the data directly to the prohibited computer system 504. Conversely, if a direct connection does not exist, the first router 504 may cause the data to be sent to another router that may further propagate the data to the prohibited computer system 504. It is noted that in various embodiments, the presence of a covert router on a routing path for the data may be sufficient to cause the data to arrive at the prohibited computer system 504 instead of the allowed computer system 506. When operating covertly the router causes the data to be redirected to the prohibited computer system 504 by addressing the data to the prohibited computer system 504. The redirection of the data may not become known by the filtering device 512.

The filtering device 512 may probe the routing path (also referred to herein as the first routing path) of the local computer system 502 to a remote computer system to attempt to determine whether the local computer system 502 is connected to the prohibited computer system 504 instead of the allowed computer system 506. The filtering device 512 may cause at least one packet (for example, a probing packet) associated with the connection to be sent to the remote computer system using a second routing path. In various embodiments, the data sent to the remote computer system using the second routing path is referred to herein as the second data portion. The second data portion may be a portion of the data transmitted by the local computer system 502. For example, in some embodiments, a portion of the data transmitted by the local computer system 502 may be sent to a remote computer system using the first routing path and the second data portion may be sent to the remote computer system using the second routing path. Further, the second data portion may be a duplicate of a packet that was transmitted using the first routing path.

To cause the packet to be sent using the second routing path, the filtering device 512 may select a second router (denoted as router 2 in FIG. 5 and referred to herein by the numeral 510) and may send the packet to the second router 510 for routing to the remote computer system destination. Causing the packet to be sent using the second routing path may be performed by changing at least temporarily a routing preference of the filtering device 512. For example, the filtering device 512 may maintain a weight associated with the first router 508 and a weight associated with the second router 510, whereby each weight may represent the preference of the filtering device 512 for routing data to each respective router or a likelihood of sending data to each respective router. One or both weights may be changed in order for the filtering device 512 to cause data to be routed to traverse the second routing path instead of the first routing path. Further, a router may be removed from a routing table of the filtering device 512 or a probability of selection associated with the router may be set to zero so as to exclude the router from selection. In some embodiments, the weight associated with the router may be set to a particular value, whereby the value may indicate that the router is to be excluded from selection.

Changing the routing path may potentially cause one or more covert routers present in the network to be avoided, whereby the one or more covert routers may not be utilized in routing the second data portion. As shown in FIG. 5, by routing the second data portion through the second router 510, the first router 508 may be avoided and kept from participating in routing the second data portion. It is noted that in some circumstances, changing data routing may not result in avoiding the one or more covert routers present in a network and the second data portion traversing the second routing path may remain to be covertly routed to the prohibited computer system 504.

In response to sending the second data portion over the second routing path, the filtering device 512 may receive a response from a remote computer system receiving the second data portion. The response may, for example, acknowledge receipt of the second data portion. Further, the response may indicate that the receiving remote computer system does not recognize the local computer system 502 from which the data originates as a party to a communication. Furthermore, the response may indicate that the receiving remote computer system lacks a context associated with the second data portion or a frame of reference associated with the second data portion. Additionally, the response may indicate that the remote computer system does not retain a state associated with the second data portion. As described herein the response may be in accordance with any communication protocol, such as TCP/IP, and the response may be a request to reset or "flush" a connection.

The filtering device 512 may evaluate the response to determine whether the response indicates that the remote computer system was not a party to a connection with the virtual computer system 502 (for example, prior to receipt of the second data portion). Accordingly, the response may indicate that the second data portion traversing the second routing path was received by an allowed computer system 506, whereas the data traversing the first routing path was received by a prohibited computer system 504 or vice-versa.

Accordingly, the response may be used as an indication of a covert attempt to circumvent one or more access control policies or cooperation between the local computer system 502 and a router to circumvent one or more access control policies.

The indication of a covert attempt to circumvent the one or more access control policies may be used to calculate a fraud score associated with the local computer system 502 or with a user utilizing the local computer system 502. The fraud score may be calculated over time and for various time periods. Further, the fraud score may be associated with a time decay factor that causes the fraud score to be more heavily weighed by recent fraud indications. For example, the fraud score for a local computer system as of time period i may be calculated as:

$$F = F_i + d(F_{i-1} + dF_{i-2}), \quad (1)$$

where $F_i$ is the fraud score recorded for time period i, $F_{i-1}$ is the fraud score recorded for the time period previous to time period i, and $F_{i-2}$ is the fraud score recorded for the time period previous to time period i−1. Further, d may be a specified decay factor that is less than 1.

A plurality of fraud scores that are recorded over a plurality of time periods may be used to calculate a time-decayed fraud score for the local computer system. It is noted that the time-decayed fraud score described herein is advantageous because it may be compactly stored, whereby one time-decayed fraud score may be maintained for each local computer system. Alternatively, a plurality of fraud scores that are recorded over a plurality of time periods may be retained (for example, a 90-day window of recorded fraud scores for a local computer system) for calculating an overall fraud score for the local computer system.

It is noted that there are various legitimate reasons for receiving a response that indicates that the receiving remote computer system does not recognize the local computer system 502 as a party to a communication or for receiving a response requesting the connection between the remote computer system and the local computer system 502 to be reset. Accordingly, receipt of such response may not be conclusive (for example, it may be a false positive) and may only indicate the potential for the existence of a covert attempt to redirect data to a prohibited computer system. Therefore, it may be advantageous to detect indications of covert attempts over time and tally the indications utilizing a time-decayed fraud score metric, as a tallied fraud score metric is less prone to a false positive indication than a single indication that is detected over one time period.

In some embodiments, a routing configuration may be identified as being covert or may be associated with a likelihood of being covert. If a routing path is associated with a likelihood of being covert, route tracing may be performed to identify the routers present on a routing path. Further, one or more correlations may be performed based on the likelihood to associate a router with a likelihood of covert activity. A router that is associated with a high likelihood of being covert may be "blacklisted" and routing paths that include the router may be avoided when forwarding data by, for example, causing data routing to be biased away from the covert router.

Figure 6:
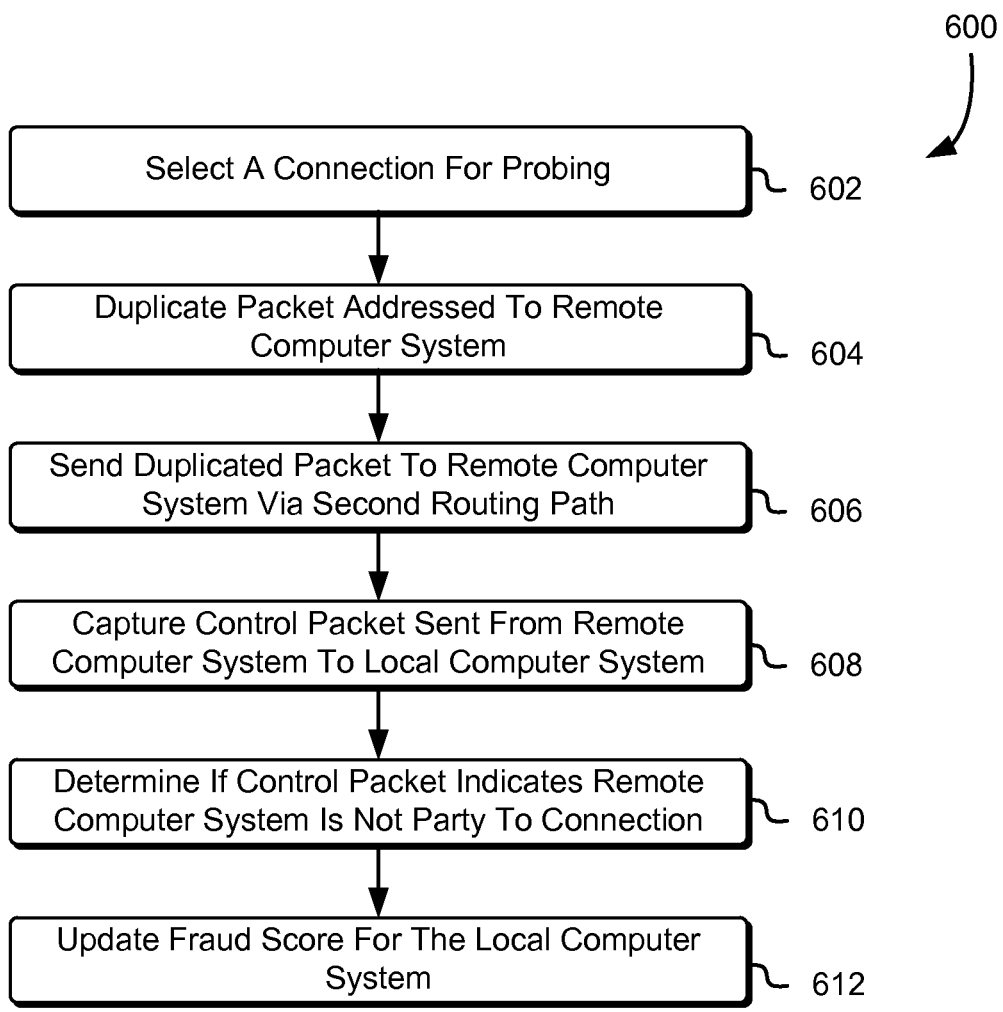
FIG. 6 shows an example of a method for detecting circumvention of access restriction in accordance with at least one embodiment.

FIG. 6 shows an example of a method for detecting circumvention of access restriction in accordance with at least one embodiment. In the process 600, a computing resource service provider, such as the one described with reference to numeral 204 in FIG. 2, selects 602 as a connection for probing. The connection may be purportedly between a local computer system and a remote computer system. The connection may traverse a first routing path in a network, whereby the first routing path may be utilized to forward one or more data packets to the remote computer system. Due to the presence of covert routers as part of the first routing path, the one or more data packets may be directed to a prohibited computer system, which the local computer system may not be permitted access.

The computing resource service provider duplicates 604 a packet addressed to the remote computer system and sends 604 the duplicated packet to the remote computer system using a second routing path. As described herein, sending the duplicated packet to the remote computer system using a second routing path may include changing at least one router of the first routing path or redirecting the duplicated packet to a different router at any stage of the first routing path. The computing resource service provider captures 608 at least one control packet sent from the remote computer system to the local computer system, whereby the at least one control packet may be sent by the remote computer system in response to receiving the duplicated packet by the remote computer system.

The computing resource service provider determines 610 if the control packet indicates that the remote computer system is not party to a connection with the local computer system. A positive determination may serve as an indication of a likelihood that one or more routers of the first routing path cause packet data transmitted by the local computer system to be redirected to a prohibited computer system. The computing resource service provider then updates 612 a fraud score of the local computer system based at least in part on the received indication.

Figure 7:
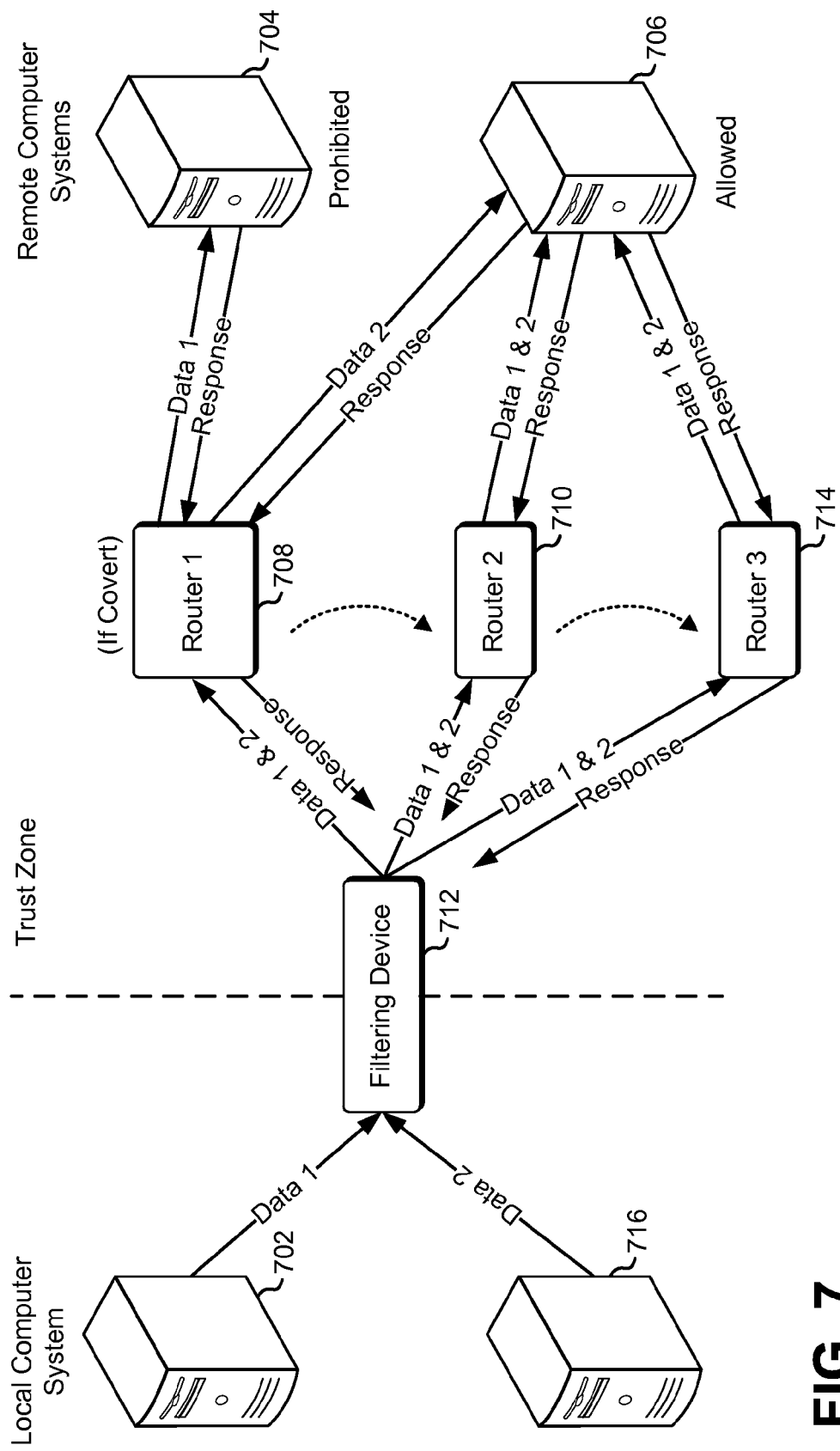
FIG. 7 shows an example of an environment for detecting circumvention of access restriction in accordance with at least one embodiment.

FIG. 7 shows an example of an environment for detecting circumvention of access restriction in accordance with at least one embodiment. A first local computer system 702 sends a first data portion to one or more remote computer systems and a second local computer system 716 sends a second data portion to one or more remote computer systems. The first or second data portions may include bits, Bytes or packets of data that are compliant with any type of communication protocol, such as TCP/IP. The remote computer systems include an allowed computer system 706, whereby the first local computer system 702 or the second local computer system 716 may be permitted to establish a connection with the allowed computer system 706 and send a data portion to the allowed computer system 706. Further, the remote computer systems include a prohibited computer system 704. The first local computer system 702 or the second local computer system 716 may be restricted from establishing a connection with the prohibited computer system 704.

The first local computer system 702 and the second local computer system 716 may each have a connection path with a remote computer system, whereby the data portion of a local computer system may traverse a respective connection path to a remote computer system. The connection path (also referred to herein as a routing path) may terminate at either end at the local computer system and the remote computer system. One or more network routers may be disposed between either ends of the routing path and may relay data between one another, a local computer system and a remote computer system. If a covert router is present on the routing path, the covert router may facilitate unrestricted access to the prohibited computer system 704.

A filtering device 712 receives the first data portion and the second data portion and forwards them to a router, which may in turn forward the first data portion and the second data portion along their respective routing paths to one or more destination remote computer systems. The first data portion and the second data portion may be addressed to the same destination remote computer system and may, accordingly, have the same routing path their destination. However, if the first data portion or the second data portion are covertly routed to a prohibited computer system, the first data portion and the second data portion may have a different routing path to their different destinations.

To alter the routing path traversed by the first data portion and the second data portion, the filtering device 712 may change the router receiving the first data portion and the second data portion from the filtering device 712. As shown in FIG. 7, the filtering device 712 is connected to three routers (a first router denoted as router 1 and referred to herein by the numeral 708, a second router denoted as router 2 and referred to herein by the numeral 710 and a third router denoted as router 3 and referred to herein by the numeral 714). In a first time period, the filtering device 712 may send the first data portion and the second data portion to the first router 708. As a covert router that is cooperating with the first local computer system 702, the first router 708 routes the first data portion of the first local computer system 702 to the prohibited computer system 704 instead of the allowed computer system 706, which is the addressed destination of the first data portion. However, because the first router 708 is not cooperating with the second local computer system 716, the covert router routes the second data portion associated with the second local computer system 716 to the allowed computer system 706, whereby the allowed computer system 706 is the addressed destination of the second data portion. Further, in a second time period, the filtering device 712 sends the first data portion and the second data portion to the second router 710. The second router 710 is not a covert router, and, accordingly, the second router 710 routes both the first data portion and the second data portion to their addressed destination of the allowed computer system 706. Due to changing the routing path, the covert router participating in the routing path of the first time period is precluded from participating in the routing path of the second time period.

For each data portion, the filtering device 712 may measure a latency associated with the data portion as it traverses a routing path. The latency may be a round trip time (RTT) associated with the data portion and may measure the time lapsed from sending the data portion to a router to receiving a response associated with the data portion. The latency may measure the time required for the data portion to arrive at a remote computer system and the time required for the response to arrive at the filtering device 712 in addition to any processing time consumed by the remote computer in processing the data portion and sending the response. The data portion and its associated response may be in accordance with a connection-oriented protocol as described herein. Further, the data portion and its associated response may each be two unidirectional connection messages. For example, the first or second data portion may be an HTTP request, whereas the response may be an HTTP response.

It is noted that the latency measurements for the first data portion and the second data portion may not be comparable as they traverse the first routing path of the first router 708 due to the fact that the first data portion and the second data portion are routed to different destinations. Further, the difference may be more pronounced when aggregated over large samples or time periods due to the fact variation not attributable to covert routing may compensate for one another. As for the second routing path, the latency measurements for the first data portion and the second data portion may be comparable due to the fact that the first data portion and the second data portion arrive at the same destination. Accordingly, a local computer system that is not cooperating with a covert router to circumvent access restriction (for example, the second local computer system 716) may be assumed to have comparable latency measurements irrespective of the routing path traversed by the local computer system's data. Conversely, the latency measurements for a local computer system that is cooperating with a covert router may be expected to change if the routing path is perturbed so as to avoid the covert router. When evaluated independently or over a small sample, the differences between latency measurements may be attributed to other factors besides covert operation. However, when evaluated in the aggregate or over time, the differences between latency measurements may become more pronounced so as to signify covert operation.

As shown in FIG. 7, in a first time period, the filtering device 712 sends the first data portion and the second data portion to the first router 708 and calculates a latency measurement associated with the first data portion (also associated with first local computer system 702) and a latency measurement associated with the second data portion (also associated with the second local computer system 716). In a second time period subsequent to the first time period, the filtering device 712 switches data routing to the second router 710, whereby in the second time period subsequently received data from the first local computer system 702 and subsequently received data from the second local computer system 716 are both routed through the second router 710. Further, for the second time period, the filtering device 712 calculates a latency measurement for the first local computer system 702 and a latency measurement for the second local computer system 716. For each local computer system, the filtering device 712 obtains a difference in the latency measurement between the first time period and the second time period. Accordingly, due to switching between the two time periods, the filtering device 712 now retains a difference in the latency measurement for the first local computer system 702 and a difference in the latency measurement for the second local computer system 702.

Over any two time periods, the filtering device 712 may switch a router and calculate a difference in the latency measurement for each local computer system, whereby each local computer system has respective data whose routing is switched. As shown in FIG. 7, over a third time period subsequent to the second time period, data received from both the first local computer system 702 and the second local computer system 716 is switched to the third router 714. Subsequently, a latency measurement is calculated for the data associated with the first local computer system 702 and is calculated for the data associated with the second local computer system 716. Further, for each computer system, a difference in the latency measurements between the second and third time periods is calculated.

As described herein, the difference in a latency measurement for a first local computer system for a first routing switch (for example, occurring between the first time period and the second time period) is denoted as $\delta_{1,1}$, where the first subscript denotes an index of the local computer system and the second subscript denotes an index of the switch in routing. Accordingly, the difference in a latency measurement for a second local computer system for the same routing switch is denoted as $\delta_{2,1}$. For the first routing switch, an overall difference in latency measurements may be calculated and denoted as $\Delta_1$, whereby $\Delta_1$ may be calculated as a function of the distribution of the plurality of differences in latency measurements (for example, as any measure of central tendency of the plurality of differences in latency measurements). For example, $\Delta_1$ may be a mean, median or mode, among others, of the plurality of differences in latency measurements (for example, $\delta_{1,1}$, $\delta_{2,1}$, $\delta_{3,1}$ and the like). For each local computer system associated with the index i, $\delta_{i,1}$ may be compared to $\Delta_1$, and if the difference exceeds a threshold, the fraud score of the local computer system may be updated to indicate potential malicious activity.

For each local computer system having the index i, $\delta_{i,1}$ may be based at least in part on a plurality of differences in latency measurements that are measured for a routing switch between the first routing path and the second routing path. Further, it may be assumed that a large number of local computer systems do not participate in covert activity and, accordingly, their associated difference in latency measurements may be used as a baseline for evaluating whether the difference in latency measurements of a particular computer system is indicative of covert routing. The difference in latency measurements of a computer system may indicate a likelihood of covert routing. As described herein, a fraud score associated of a computer system may be updated in accordance with the determined likelihood. For example, if the difference is greater than a threshold above or below the baseline, the fraud score is updated to indicate a potential for covert routing. Further, the fraud score for a computer system may be updated so as to credit the computer system if covert activity is not suspected (for example, if the difference in latency measurement for the computer system is comparable to the baseline or within a small margin of the baseline.

Figure 8:
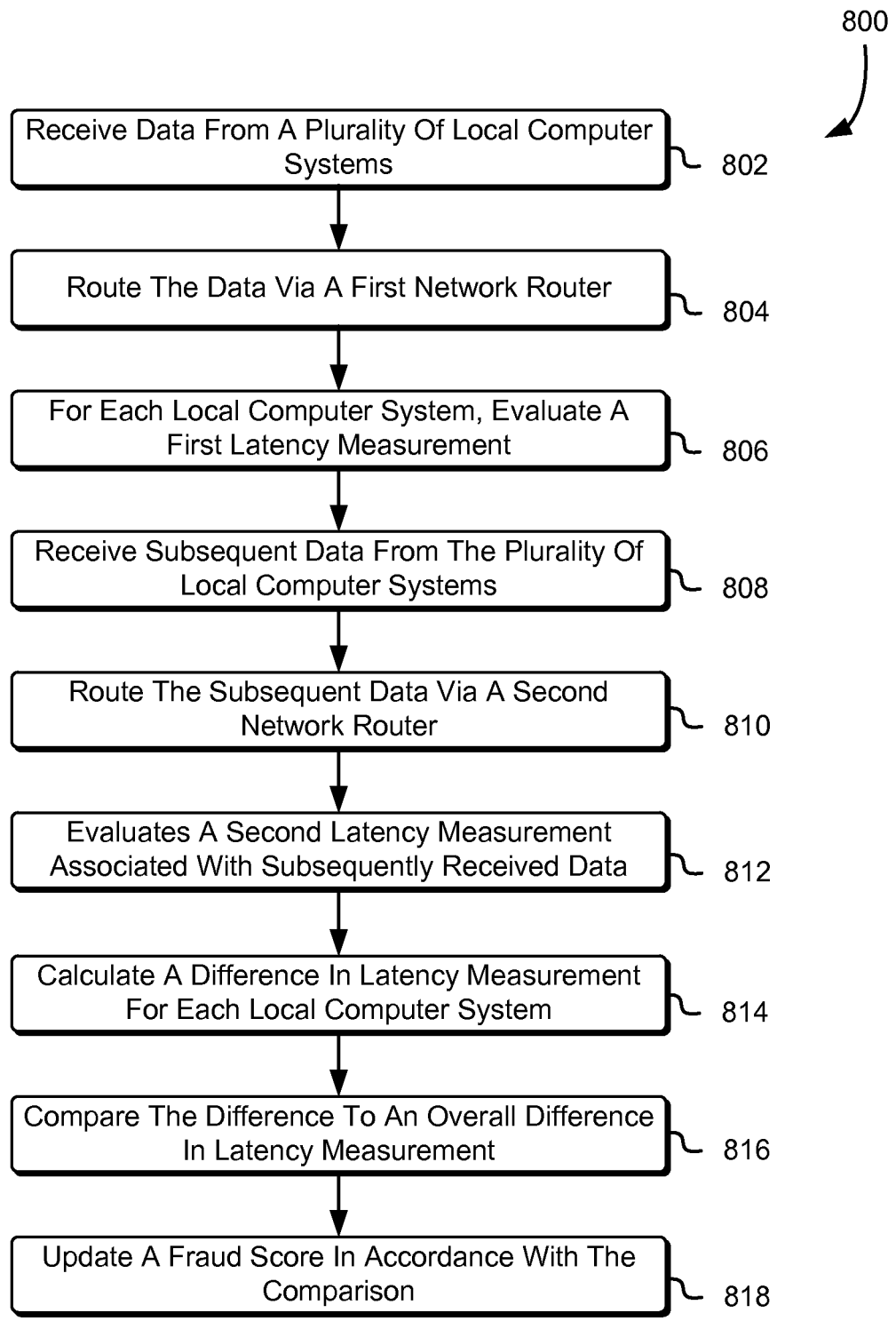
FIG. 8 shows an example of a method for updating a fraud score of a local computer system in accordance with at least one embodiment.

FIG. 8 shows an example of a method for updating a fraud score of a local computer system in accordance with at least one embodiment. In the process 800, a filtering device receives 802 data from a plurality of local computer systems. The data may comprise a plurality of data portions, whereby each data portion may be received from a local computer system of the plurality of local computer systems. The filtering device may be part of a computing resource service provider and the data may be addressed to a remote computer system. The filtering device routes 804 the data via a first network router, whereby the first network router may further forward the data in a network. The filtering device then evaluates 806 a first latency measurement for each local computer system. For each local computer system and its associated data portion, the first latency measurement may represent the time that lapsed between sending the data portion to the first router and receiving, by the filtering device, a response message from a receiving remote computer system.

The filtering device then receives 808 subsequent data from the plurality of local computer systems. Similar to the previously received data, the subsequently received data may comprise a plurality of data portions, whereby each data portion may be received from a local computer system of the plurality of local computer systems. The filtering device routes 810 the subsequent data via a second network router, whereby the second network router is different from the first network router. The filtering device then evaluates 812, for each local computer system, a second latency measurement. Similar to the first latency measurement the filtering device evaluates, for each local computer system and its associated subsequent data portion, the second latency measurement may represent the time that lapsed between sending the subsequent data portion to the first router and receiving, by the filtering device, a response message from a receiving remote computer system.

The filtering device calculates 814 a difference in latency measurement for each local computer system. The filtering device then compares 816 the difference in latency measurement for each local computer system to an overall difference in latency measurement. The overall difference in latency measurement may be a function of the distribution of the plurality of differences in latency measurements that are associated with the plurality of local computer systems. For example, the overall difference in latency measurement may be a measure of the central tendency of the plurality of differences in latency measurements. The filtering device then updates 818 a fraud score for each local computer system of the plurality of local computer systems in accordance with the comparison. For example, if the difference in latency measurement of a computing device deviates greatly from the overall difference, the deviation may be evidence of fraudulent or malicious activity.

In some embodiments, a switch in routing as described herein may only apply to data that is purported to be intended to a specific remote computer system and may not affect all data that originates from a local computer system. Accordingly, only data that is expected to be similarly routed may be used as a baseline for latency measurement. Further, when data that is addressed to a remote computer system is not suspected of being covertly redirected to another computer system, the routing of the data may be switched so as to serve as a baseline for latency associated with another computer system that cooperates in covert routing. Further, if a local computer system establishes a connection with a remote computer system after the occurrence of a routing switch, latency measurements associated with the connection may not be utilized due to the lack of a recorded latency measurement prior to the routing switch and, thus, a lack of a frame of reference by which to evaluate the latency measurement.

Figure 9:
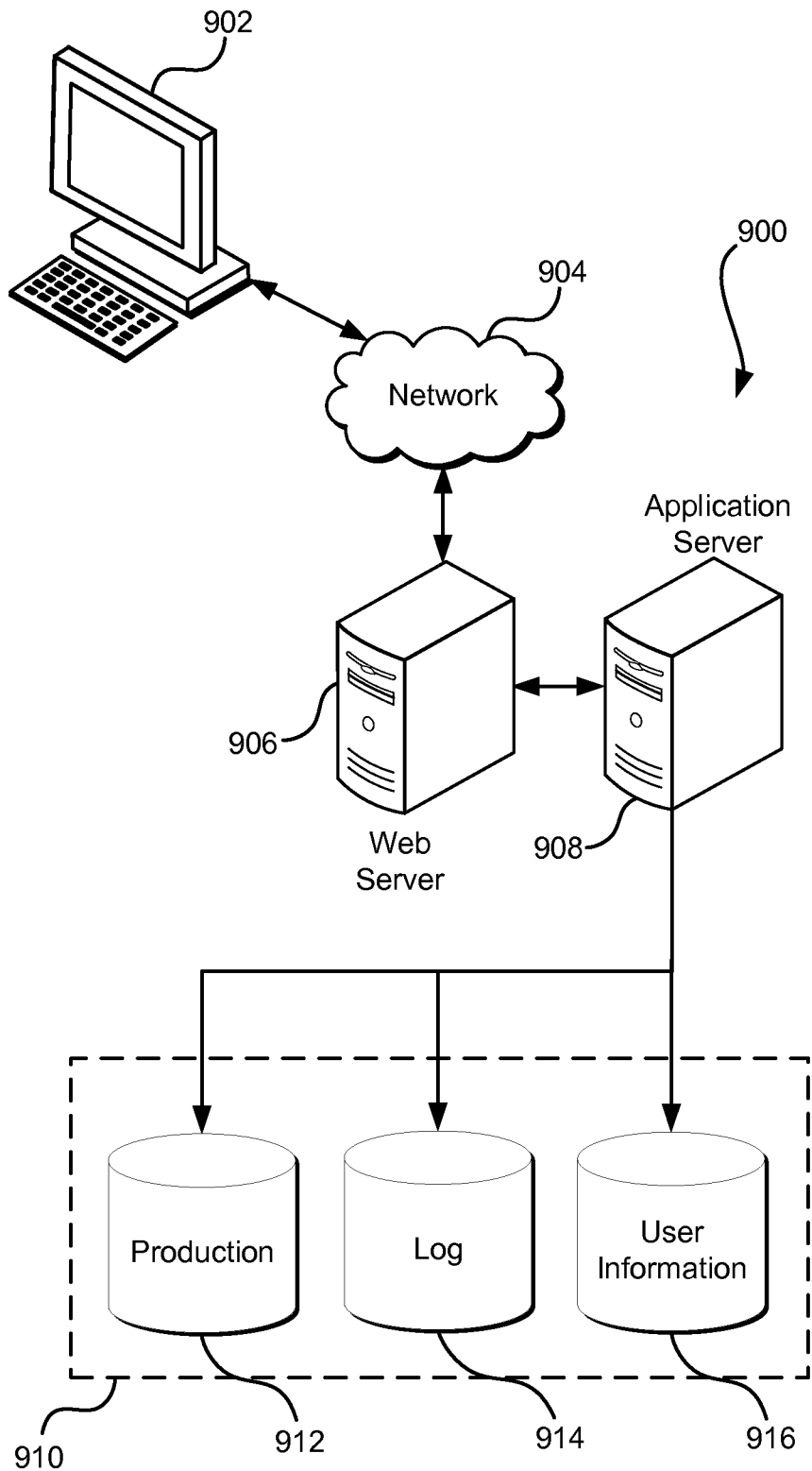
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

The invention claimed is:

1. A computer-implemented method for detecting covert routing, comprising:

under the control of one or more computer systems configured with executable instructions,
  obtaining a first latency measurement for each computer system of a plurality of computer systems, the first latency measurement specifying a time difference between sending a first data portion of the computer system traversing a first routing path and receiving a first message in response to the first data portion;
  obtaining a second latency measurement for each computer system of the plurality of computer systems, the second latency measurement specifying a time difference between sending a second data portion of the computer system traversing a second routing path and receiving a second message in response to the second data portion, wherein the first data portion and the second data portion are addressed to a first remote computer system;
  calculating a difference in latency for a computer system of the plurality of computer systems based at least in part on the first latency measurement and the second latency measurement of the computer system;
  updating a fraud score associated with the computer system of the plurality of computer systems based at least in part on the difference in latency for the computer system of the plurality of computer systems and one or more other computer systems of the plurality of computer systems; and
  providing the updated fraud score for use.

2. The computer-implemented method of claim 1, wherein the first routing path and the second routing path are selected based at least in part on a diversity of the routing paths.

3. The computer-implemented method of claim 1, wherein updating the fraud score is based at least in part on one or more of: the difference in latency for the computer system of the plurality of computer systems exceeding a threshold that indicates a likelihood that the first data portion or the second data portion was not received by the first remote computer system, a likelihood that a first router of the first routing path forwards the first data portion to a second remote computer system or a likelihood that a second router of the second routing path forwards the second data portion to the second remote computer system.

4. The computer-implemented method of claim 3, wherein:
  access by the computer system of the plurality of computer systems to the first remote computer system is unrestricted; and
  access by the computer system of the plurality of computer systems to the second remote computer system is restricted.

5. The computer-implemented method of claim 1, wherein updating a fraud score associated with a computer system of the plurality of computer systems further includes:
  calculating an overall difference in latency for the plurality of computer systems based at least in part on a distribution of a plurality of differences in latency associated with the plurality of computer systems;
  comparing the difference in latency for the computer system of the plurality of computer systems to the overall difference in latency; and
  updating the fraud score based at least in part on the comparison.

6. The computer-implemented method of claim 1, wherein the fraud score that is associated with the computer system is associated with a user of the computer system.

7. A system, comprising at least one computing device that implements one or more services, wherein the one or more services:
route a first set of data portions addressed to a compute node via a first router;
route a second set of data portions addressed to the compute node via a second router;
calculate a difference in latency between the first set of data portions and the second set of data portions to form a calculated difference in latency;
determine, based at least in part on the calculated difference in latency, information indicative of whether at least a portion of the first set of data portions or at least a portion of the second set of data portions were sent to a restricted compute node;
update, based at least in part on the calculated difference in latency, a fraud score associated with a computer systems of a plurality of computer systems; and
provide the fraud score.

8. The system of claim 7, wherein:
the first set of data portions includes a plurality of first data portions sent from the plurality of computer systems; and
the second set of data portions includes a plurality of second data portions sent from the plurality of computer systems.

9. The system of claim 8, wherein the one or more services further perform
a security action based at least in part on the fraud score, the security action including one or more of:
denying the computer system of the plurality of computer systems access to the compute node,
routing incoming data away from the first router,
routing the incoming data away from the second router, or
causing a notification to be sent to a system administrator.

10. The system of claim 8, wherein the fraud score associated with the computer system of the plurality of computer systems is associated with a user of the computer system.

11. The system of claim 8, wherein on a condition that the fraud score exceeds a threshold, the fraud score is indicative that the computer system of the plurality of computer systems cooperates with a router to circumvent an enforced policy for controlling access to the restricted compute node.

12. The system of claim 8, wherein calculating the difference in latency between the first set of data portions and the second set of data portions further includes, for each computer system of the plurality of computer systems:
obtaining a first latency measurement based at least in part on a time of routing the first data portion of the first set of data portions and a time of receiving a response to the first data portion;
obtaining a second latency measurement based at least in part on a time of routing the second data portion of the second set of data portions and a time of receiving a response to the second data portion; and
comparing a difference in latency between the first latency measurement and the second latency measurement to one or more differences in latencies associated with one or more other computer systems of the plurality of computer systems.

13. The system of claim 12, wherein comparing a difference in latency between the first latency measurement and the second latency measurement to one or more differences in latencies associated with one or more other computer systems of the plurality of computer systems further includes comparing the difference in latency to a function of a distribution of differences in latencies for the plurality of computer systems.

14. A non-transitory computer-readable storage medium having collectively stored thereon executable instructions that, as a result of execution by one or more processors of a computer system, cause the computer system to at least:
forward a plurality of first data portions associated with a plurality of computer systems over a first network path, the plurality of first data portions being addressed to a remote computer system;
obtain a plurality of first network performance metrics, each first network performance metric of the plurality of first network performance metrics being associated with a routing of a first data portion of the plurality of first data portions over the first network path;
determine information indicative of whether the first data portion of the plurality of first data portions is covertly routed based at least in part on the plurality of first network performance metrics;
update, based at least in part on the information, a fraud score associated with a computer system of a plurality of computer systems; and
provide the fraud score.

15. The non-transitory computer-readable storage medium of claim 14, wherein:
the instructions further comprise instructions that cause the computer system to:
forward a plurality of second data portions associated with the plurality of computer systems over a second network path, the plurality of second data portions being addressed to the remote computer system; and
obtain a plurality of second network performance metrics, each second network performance metric of the plurality of second network performance metrics being associated with a routing of a second data portion of the plurality of second data portions over the second network path; and
the instructions that cause the computer system to determine the information indicative of whether the first data portion of the plurality of first data portions is covertly routed further include instructions that cause the computer system to determine a likelihood that at least one data portion of the plurality of first data portions or the plurality of second data portions is covertly routed based at least in part on the plurality of first network performance metrics and the plurality of second network performance metrics.

16. The non-transitory computer-readable storage medium of claim 15, wherein:
the instructions that cause the computer system to update the fraud score further comprise instructions that cause the computer system to update the fraud score based at least in part on the likelihood determined; and
the at least one data portion is sent by the computer system of the plurality of computer systems.

17. The non-transitory computer-readable storage medium of claim 14, the fraud score that is associated with the computer system of the plurality of computer systems is associated with a user of the computer system.

18. The non-transitory computer-readable storage medium of claim 14, wherein a first performance metric of the plurality of first network performance metrics is a latency measurement indicating an amount of time that lapses between sending a first data portion of the plurality of first data portions over the first network path and receiving a message in response to the first data portion.

19. The non-transitory computer-readable storage medium of claim 14, wherein the information indicative of whether a first data portion is covertly routed is information indicating that the at least one first data portion of the plurality is being forwarded to a restricted computer system.

20. The non-transitory computer-readable storage medium of claim 14, wherein the instructions further comprise instructions that cause the computer system to:
   identify a likelihood that the first network path is a covert path based at least in part on the information indicative of whether the first data portion of the plurality of first data portions is covertly routed; and
   use the likelihood that the first network path is a covert path to negatively bias routing data using the first network path.

* * * * *